United States Patent [19]
Normoyle et al.

[11] Patent Number: 5,894,587
[45] Date of Patent: Apr. 13, 1999

[54] MULTIPLE BUS BRIDGE SYSTEM FOR MAINTAINING A COMPLETE ORDER BY DELAYING SERVICING INTERRUPTS WHILE POSTING WRITE REQUESTS

[75] Inventors: Kevin Normoyle, Santa Clara; David Penry; Jui-Cheng Su, both of Sunnyvale, all of Calif.

[73] Assignee: Sun Microsystems, Inc., Palo Alto, Calif.

[21] Appl. No.: 08/884,847

[22] Filed: Jun. 30, 1997

[51] Int. Cl.⁶ .................................... G06F 13/00
[52] U.S. Cl. ............... 395/306; 395/309; 395/877; 395/868; 395/733
[58] Field of Search ................ 395/280–310, 395/855–881, 733–739

[56] References Cited

U.S. PATENT DOCUMENTS

| | | | |
|---|---|---|---|
| 5,546,546 | 8/1996 | Bell et al. | 395/292 |
| 5,588,125 | 12/1996 | Bennett | 395/306 |
| 5,717,876 | 2/1998 | Robertson | 395/309 |
| 5,761,450 | 6/1998 | Shah | 395/308 |
| 5,761,460 | 6/1998 | Santos et al. | 395/309 |
| 5,761,725 | 6/1998 | Zeller et al. | 711/146 |
| 5,764,929 | 6/1998 | Kelly et al. | 395/287 |
| 5,764,933 | 6/1998 | Richardson et al. | 395/308 |
| 5,768,548 | 6/1998 | Young et al. | 395/309 |
| 5,778,235 | 7/1998 | Robertson | 395/728 |
| 5,778,236 | 7/1998 | Gephardt et al. | 395/709 |

*Primary Examiner*—Christopher B. Shin
*Attorney, Agent, or Firm*—Townsend and Townsend and Crew LLP

[57] ABSTRACT

A system for maintaining completion order in a multiple bus system including a bridge that posts write data includes logic units for implementing a DRAIN/EMPTY protocol. A bridge logic unit asserts an EMPTY signal when the secondary posting buffers are empty. Interrupt processing is delayed until the EMPTY signal is asserted thereby assuring that all writes are completed. If an interrupt is received and the EMPTY signal is not asserted then a DRAIN signal is asserted while the EMPTY signal is not asserted. The bridge retries all upstream write requests until EMPTY is asserted.

2 Claims, 3 Drawing Sheets

MULTIPLE BUS BRIDGE SYSTEM FOR MAINTAINING A COMPLETE ORDER BY DELAYING SERVICING INTERRUPTS WHILE POSTING WRITE REQUESTS

BACKGROUND OF THE INVENTION

1. Field of the Invention

The invention relates generally to ordering events in a computing system and more particularly to maintaining the completion order of events in a computer system.

2. Description of the Relevant Art

As processors and computing subsystems get faster and faster (and more complicated), "implicit ordering requirements" are being discovered between events that occur during the operation of a computer. These ordering requirements can be thought of as a detailed contract between hardware designers and software writers that goes beyond the instruction set of a computer and the "memory model".

A memory model is a recently well-documented contractual statement that varies amongst computer systems and states how the completion of loads and stores are guaranteed. In high performance systems they don't complete in the order written in a program.

These ordering requirements sometimes weren't explicitly described or required by prior hardware/software systems, only because either communication delays were balanced for all events, or the events were serialized by a single communications medium, or the interesting events never occurred in parallel. Therefore, failures due to improper ordering or re-ordering never occurred.

An example is an I/O subsystem, e.g., a disk drive, that has the ability to write data to main memory on its own, independent of the processor. This kind of subsystem is activated by code running on the processor and, after the write to main memory is finished, the processor's software needs to be notified, usually by an interrupt.

In systems with complicated memory systems, the subsystem may believe it has completed all its writes, when, in fact, the writes are still not all the way in the main memory, i.e., the write data is still in temporary buffers. This is because there usually isn't an acknowledge back from the final destination (main memory) to the subsystem for a variety of implementation reasons.

If the interrupt path to the processor is direct enough, the processor may receive the interrupt signifying completion and try to read the new data from main memory before it is actually there. This would be an error, since the software assumes it should be there.

PCI, the industry-standard Peripheral Component Interface, doesn't specify the ordering of interrupts or a transmission mechanism to the processor. Therefore, some modern operating systems, which assume this interrupt/prior write ordering, need a mechanism to guaranty it.

Bus Bridges, which isolate bus segments electrically, usually have buffers that accumulate the data for reads and writes temporarily delaying the transmission and completion of memory transaction initiated by a computing subsystem. Since the interrupts are usually transmitted through a means independent of the bus bridge, the interrupts typically arrive at the processor quickly. Thus, the bus bridges exacerbate the interrupt/prior write completion problem.

As set forth in the PCI specification, ordering is maintained by a system of buffer-flushing. According to the specification, a read transaction must push ahead of it through the bridge any posted writes originating on the same side of the bridge and posted before the read. Before the read transaction can complete on its originating bus, it must pull out of the bridge any posted writes that originated on the opposite side of the bridge and were posted before the read command completes on the read-destination bus.

For example, a common situation is the writing of data to a cache and writing a cache invalidation flag. Typically, an interrupt will signal the completion of both writes. However, the writes could be posted to the bridge buffers and may not reside at the cache and invalidation flag. Accordingly, if the CPU issues a cache read command, both writes are pulled out of the bridge buffers before the CPU read command completes.

The mechanism of buffer-flushing can lead to deadlocks and is not necessary for all read operations.

SUMMARY OF THE INVENTION

The present invention assures completion ordering without requiring buffer-flushing. According to one aspect of the invention, an interrupt for an I/O device is not serviced until all upstream write data posted in the posting buffer prior to the assertion of the interrupt has been transferred from the posting buffer. This assures that all upstream writes have been completed prior to servicing the interrupts.

According to another aspect of the invention, the bridge asserts an EMPTY signal when no upstream writes are posted. If the EMPTY signal is asserted then an interrupt is serviced when the interrupt is received at the processor.

According to another aspect of the invention, a logic unit in the CPU asserts a DRAIN signal only if an interrupt is received and the EMPTY signal is not asserted. The CPU continues to assert DRAIN and delays servicing the interrupt until the EMPTY signal is asserted. The bridge retries all upstream write requests while the DRAIN signal is asserted.

According to another aspect of the invention, if a bus system includes a hierarchy of PCI bridges and buses then a hierarchical DRAIN/EMPTY protocol is implemented.

Other features and advantages of the invention will be apparent in view of the following detailed description and appended drawings.

DETAILED DESCRIPTION OF THE PREFERRED EMBODIMENTS

To better understand the following description the following terms are defined:

Complete A transaction becomes complete (a completion) when data actually is transferred (or the transaction is aborted).

Destination The bus containing the final target for a transaction.

Master An agent that initiates transactions.

Originating The bus containing the original master for a transaction.

Target An agent that responds to a transaction.

Request A transaction is considered to be a request when it is presented to the bus.

Retry A signal to a Master terminating a request (but signalling to the Master to try again later).

Upstream Accesses by a master on the secondary bus to a target on the primary bus.

Figure 1:
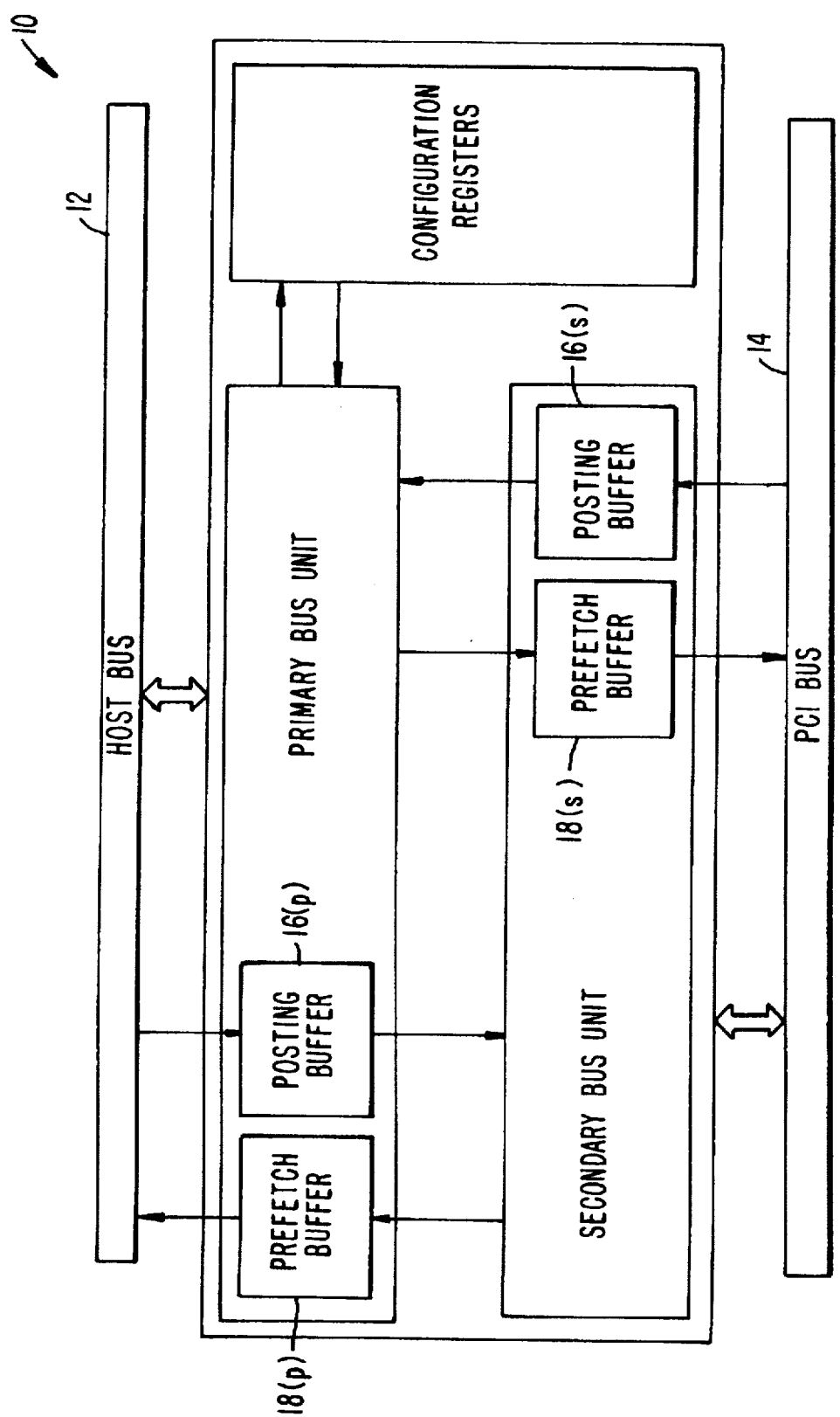
FIG. 1 is a schematic diagram of a PCI bridge.

FIG. 1 depicts the typical layout of a PCI bridge 10. The local bus to the host CPU, or to a PCI bridge located nearer to the host CPU, is known as the primary bus 12. The PCI bus to the PCI units, or to a further PCI bridge, is known as the secondary bus 14. The bridge 10 includes posting buffers 16 that temporarily store write data in order to pass it on to an addressed bus later and prefetch buffers 18 that read in data as a reserve if a read access has been previously performed and it is possible that further accesses may be required.

The inclusion of the posting buffers 16 provides for posted memory writes where a memory write or memory write with invalidation is completed on the originating bus before completing on the destination bus. As described above, according to the PCI specification, a read transaction on the destination bus would pull all posted memory writes out of the bridge 10 before completing.

Figure 2:
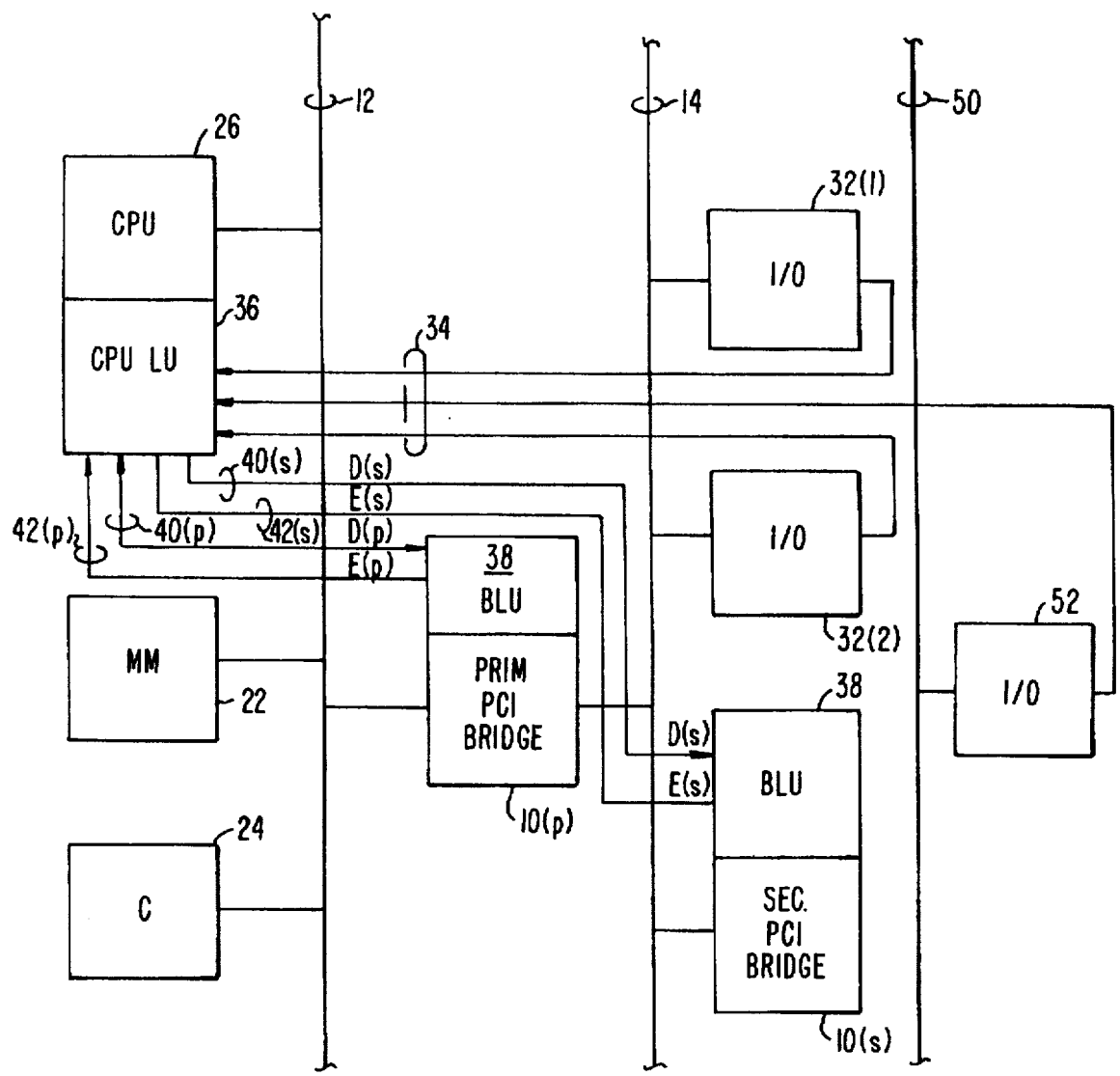
FIG. 2 is a schematic diagram of a preferred embodiment of the invention.

FIG. 2 is a block diagram of a preferred embodiment of the present invention. The processor/main memory subsystem 20 (including main memory 22, a cache 24, and a CPU 26) and a primary PCI bridge 10(p), are coupled to the host bus 12. The primary PCI bridge 10(p) forms an interface between the Host Bus 12 and a secondary PCI bus 14 which has several I/O devices 32(i) coupled to bus slots of the secondary PCI bus 14. Each I/O device 32(1) has an interrupt line 34(i) coupled to a CPU logic unit 36 included in the CPU 26. The CPU logic unit 36 also includes a primary DRAIN output coupled to a DRAIN input of a bridge logic unit 38, included in the primary PCI bridge 10(p) by a primary DRAIN line 40(p). The CPU logic device 36 also includes an primary EMPTY input pin coupled to an EMPTY output pin on the bridge logic device 38 of the primary PCI bridge 10(p) by a primary EMPTY line 42(p).

Figure 3:
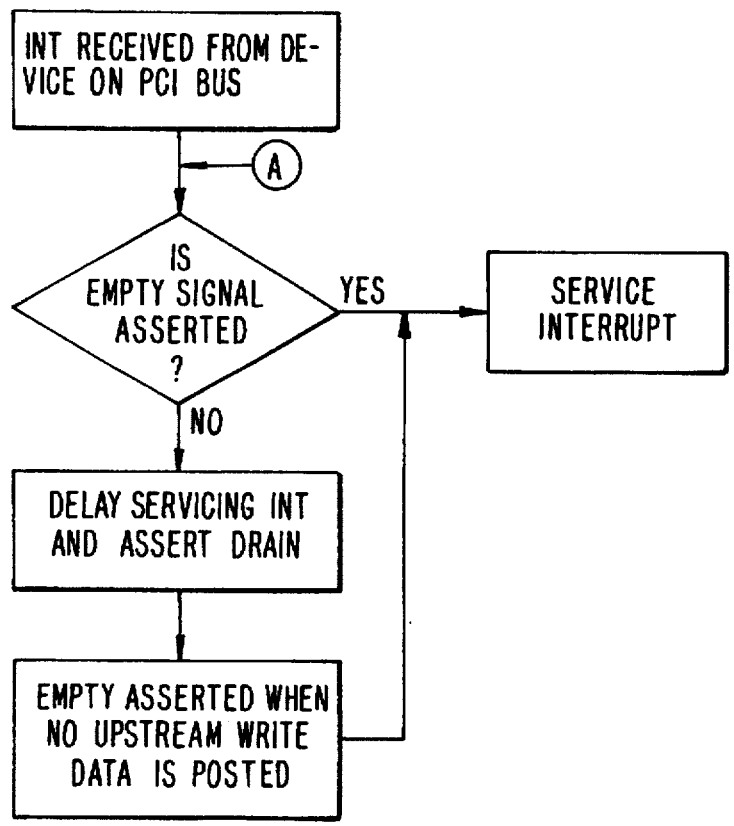
FIG. 3 is a flowchart describing steps of maintaining completion order.

The operation of the system to synchronize interrupts and upstream writes will now be described with reference to the flow chart of FIG. 3. The bridge logic unit 38 of primary PCI bridge 10(p) asserts the EMPTY signal when no write data is posted in the secondary posting buffers 16(s). Assume that the I/O device is a disk drive and that INT is asserted when the disk drive completes its write to the cache and sets the cache invalidate flag. When the INT signal is received at the CPU logic unit 36 it is determined whether the primary EMPTY signal E(p) is asserted. If yes, then the CPU 26 can respond to the INT and read the cache 24 because the cache invalid flag is set and the data has been written to main memory. If no, then the primary DRAIN signal D(p) is asserted and interrupt servicing is delayed until no upstream write data is posted in the secondary posting buffers 16(s) and the primary EMPTY signal E(p) is asserted. Also, the primary PCI bridge 10(p) retries all upstream writes while the primary DRAIN signal D(p) is asserted so that the posting buffer will empty in a short time. Thus, it is assured that the writes from the disk drive are completed prior to servicing the interrupt.

If more than one PCI bridge 10 is disposed between the I/O device asserting the interrupt and the CPU 26 then there is a hierarchy of DRAIN/EMPTY events. As depicted in FIG. 2, an agent connected to the secondary PCI bus 14 can be a secondary PCI bridge 10(s) interfacing the secondary PCI bus 14 to a tertiary PCI bus 50. If an I/O device 52 connected to the tertiary PCI bus 50 asserts its interrupt then the upstream write data could be posted in the posting buffers 16 of either the primary or secondary PCI bridges 10(p) or 10(s).

In FIG. 2, a secondary DRAIN output of the CPU logic unit 36 is coupled to the DRAIN input of the secondary PCI bridge 10(s) by a secondary DRAIN line 40(s) and secondary EMPTY input of the CPU logic unit 36 is coupled to the EMPTY output of the secondary PCI bridge 10(s) by a secondary EMPTY line 42(s).

Figure 4:
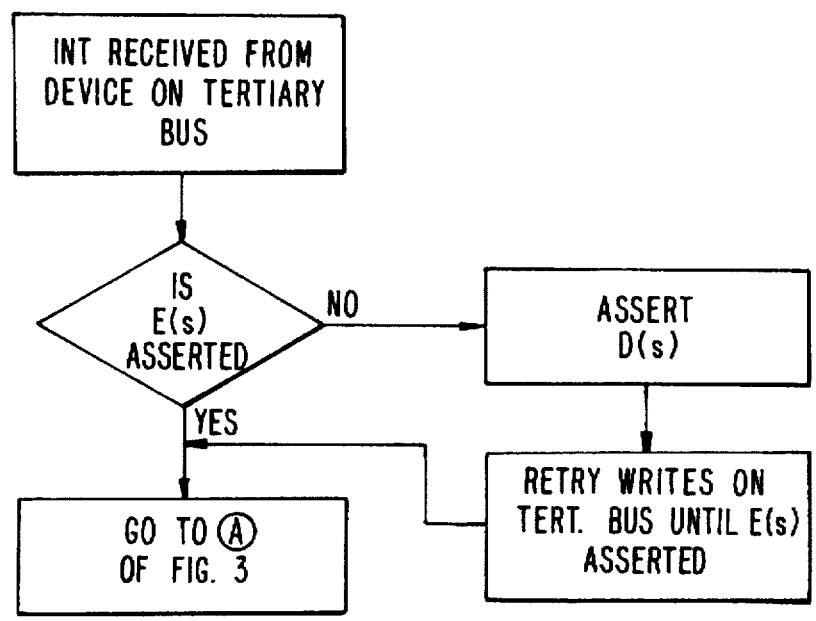
FIG. 4 is a flowchart describing steps for implementing a DRAIN/EMPTY protocol hierarchy.

In this case, if the primary PCI bridge 10(p) were to retry all writes then the posted write data in the posting buffers 16 the secondary PCI bridge 10(s) could never move to the posting buffers 16 of the primary PCI bridge 10(p). Accordingly, the primary PCI bridge 10(p) must continue to accept write data from the secondary PCI bridge 10(s) until the secondary PCI bridge 10(s) asserts its EMPTY signal. With reference to FIG. 4, this is accomplished by asserting the secondary DRAIN signal D(s) to bridge logic unit 38 the secondary PCI bridge 10(s) and then asserting the primary DRAIN signal D(p) to the bridge logic unit 38 of the primary PCI bridge 10(p) after the bridge logic unit 38 of the secondary PCI bridge 10(s) asserts its EMPTY signal E(s). Thus, the secondary PCI bridge 10(s) immediately retries all DMA writes when its DRAIN signal D(s) is asserted. Once the secondary PCI bridge 10(s) has asserted its EMPTY signal E(s) then the primary DRAIN signal D(p) is asserted to cause the primary PCI bridge 10(p) to retry all upstream writes. Accordingly, the write posting buffers in both bridges are empty before the interrupt is serviced.

In the preferred embodiment, the CPU logic unit 26 and bridge logic units 38 are implemented as state machines according to techniques known in the art. When an interrupt is received the CPU logic unit state machine 36 causes the interrupt to be serviced if EMPTY signals are received at both the primary and secondary EMPTY inputs. A DRAIN signal is asserted on the second DRAIN output until an EMPTY signal is received at the second DRAIN input, and a DRAIN signal is asserted on the primary DRAIN input if an EMPTY signal is received on the secondary EMPTY input until an EMPTY signal is received at the primary EMPTY input.

The bridge logic unit state machine causes EMPTY to be asserted when the write posting buffer is EMPTY. If DRAIN is asserted all write requests are retried.

In the foregoing specification, the invention has been described with reference to specific exemplary embodiments thereof. It will, however, be evident that various modifications and changes may be made thereunto without departing from the broader spirit and scope of the invention as set forth in the appended claims. For example, the control of the DRAIN/EMPTY signals could be accomplished under program control. Additionally, the DRAIN/EMPTY hierarchical protocol can be extended to multiple bridges.

What is claimed is:

1. In a multiple bus system, an improved system for assuring completion order comprising:

a primary bus;

a secondary bus;

a primary bridge coupling the primary and secondary buses, with the primary bridge including primary posting buffers for posting write data to be transferred to the secondary bus and secondary posting buffers for posting write data to be transferred to the primary bus and with the primary bridge including a bridge logic unit for asserting a primary EMPTY signal when no write data is posted in the secondary posting buffers;

an I/O unit coupled to the secondary bus, with the I/O unit asserting an I/O interrupt signal when it has completed a write operation;

a tertiary bus;

a secondary bridge coupling the secondary and tertiary buses, with the secondary bridge including secondary posting buffers for posting write data to be transferred to the tertiary bus and tertiary posting buffers for posting write data to be transferred to the secondary bus and with the secondary bridge including a bridge logic unit for asserting an EMPTY signal when no write data is posted in the tertiary posting buffers;

a CPU interrupt control unit, coupled to receive the I/O interrupt signal and having a primary EMPTY signal input coupled to receive said EMPTY signal asserted by the bridge logic unit of said primary bridge, a secondary EMPTY signal input coupled to receive the EMPTY signal asserted by the bridge logic unit of said secondary bridge, a primary DRAIN output coupled to the DRAIN input of the bridge logic unit of said primary bridge, and a secondary DRAIN output coupled to the DRAIN input of the bridge logic unit of said secondary bridge, said CPU interrupt control unit for asserting the servicing said interrupt if EMPTY signals are received at the primary and secondary EMPTY inputs, for delaying servicing an interrupt and asserting a DRAIN signal only on said secondary DRAIN output if no EMPTY signal is received at the secondary DRAIN input, and for asserting a DRAIN signal only on said primary DRAIN output if an EMPTY signal is received at the secondary EMPTY input but not at the primary EMPTY input;

with said bridge logic unit of said primary bridge, coupled to said primary DRAIN output to receive said DRAIN signal and for retrying write requests from said secondary bus when said DRAIN signal is asserted;

with said bridge logic unit of said secondary bridge coupled to receive said DRAIN signal and for retrying write requests from said tertiary bus when said DRAIN signal is asserted.

2. In a multiple bus system, an improved system for assuring completion order comprising:

a primary bus;

a secondary bus;

a primary bridge coupling the primary and secondary buses, with the primary bridge including primary posting buffers for posting write data to be transferred to the secondary bus and secondary posting buffers for posting write data to be transferred to the primary bus and with the primary bridge including a bridge logic unit for asserting an EMPTY signal when no write data is posted in the secondary posting buffers;

an I/O unit coupled to the secondary bus, with the I/O unit asserting an I/O interrupt signal when it has completed a write operation;

a CPU interrupt control unit, coupled to receive the I/O interrupt signal and said EMPTY signal, for servicing an interrupt when said interrupt signal is asserted and said EMPTY signal is asserted and for delaying the servicing of an interrupt and asserting a DRAIN signal when said interrupt signal is asserted and said EMPTY signal is not asserted;

with said bridge logic unit of said primary bridge, coupled to receive said DRAIN signal and for retrying write requests from said secondary bus when said DRAIN signal is asserted.

* * * * *

UNITED STATES PATENT AND TRADEMARK OFFICE
CERTIFICATE OF CORRECTION

PATENT NO. : 5,894,587
DATED : April 13 199
INVENTOR(S) : Normoyle et al.

It is certified that error appears in the above-identified patent and that said Letters Patent is hereby corrected as shown below:

Col. 5, line 23: Insert --of-- after "servicing".
Col. 5, line 30: Delete "," after "bridge".

Signed and Sealed this

Twenty-first Day of September, 1999

Q. TODD DICKINSON

Attest:

*Attesting Officer*  *Acting Commissioner of Patents and Trademarks*